(12) United States Patent
Merklein

(10) Patent No.: US 8,203,714 B2
(45) Date of Patent: Jun. 19, 2012

(54) METHOD FOR THE CAMERA-ASSISTED DETECTION OF THE RADIATION INTENSITY OF A GASEOUS CHEMICAL REACTION PRODUCT AND USES OF SAID METHOD AND CORRESPONDING DEVICE

(76) Inventor: Thomas Merklein, Erlangen (DE)

(*) Notice: Subject to any disclaimer, the term of this patent is extended or adjusted under 35 U.S.C. 154(b) by 333 days.

(21) Appl. No.: 12/527,927

(22) PCT Filed: Mar. 11, 2008

(86) PCT No.: PCT/EP2008/001923
§ 371 (c)(1),
(2), (4) Date: Aug. 20, 2009

(87) PCT Pub. No.: WO2008/110341
PCT Pub. Date: Sep. 18, 2008

(65) Prior Publication Data
US 2010/0020310 A1    Jan. 28, 2010

(30) Foreign Application Priority Data
Mar. 13, 2007  (DE) .......................... 10 2007 012 553

(51) Int. Cl.
*G01N 21/00* (2006.01)
(52) U.S. Cl. ....................................................... 356/432
(58) Field of Classification Search .................... 356/432
See application file for complete search history.

(56) References Cited

U.S. PATENT DOCUMENTS

| 7,887,752 B2 * | 2/2011 | Heiner et al. ................ 422/68.1 |
| 2004/0219063 A1 * | 11/2004 | Heiner et al. ................ 422/68.1 |
| 2007/0177650 A1 * | 8/2007 | Huston et al. ................ 374/130 |

FOREIGN PATENT DOCUMENTS

| DE | 197 10 206 A1 | 9/1998 |
| EP | 0 469 258 A | 2/1992 |
| EP | 0 616 200 A | 9/1994 |
| EP | 1 091 175 A | 4/2001 |

* cited by examiner

*Primary Examiner* — Roy M Punnoose
(74) *Attorney, Agent, or Firm* — Henry M. Feiereisen

(57) ABSTRACT

According to the invention, an RGB-color camera is used to detect the radiation intensity of a reaction product in red, green or blue wavelength range such that the respective blue signal (IB) of the RGB-color camera is used to produce a band radiation value (BS) of the respective reaction product and the respective red and/or green signal (IR, IG) of the RGB-color camera is used to produce the thermal radiation value (TS) by means of pyrometry or comparative pyrometry, whereby the difference of the respective range radiation value (BS) and the respective associated thermal radiation value (TS) is used to produce an emission rate (K) for the radiation intensity of the respective reaction product.

13 Claims, 6 Drawing Sheets

METHOD FOR THE CAMERA-ASSISTED DETECTION OF THE RADIATION INTENSITY OF A GASEOUS CHEMICAL REACTION PRODUCT AND USES OF SAID METHOD AND CORRESPONDING DEVICE

CROSS-REFERENCES TO RELATED APPLICATIONS

This application is the U.S. National Stage of International Application No. PCT/EP2008/001923, filed Mar. 11, 2008, which designated the United States and has been published as International Publication No. WO 2008/110341 and which claims the priority of German Patent Application, Serial No. 10 2007 012 553.6, filed Mar 13, 2007, pursuant to 35 U.S.C. 119(a)-(d).

Method for the camera-assisted detection of the radiation intensity of a gaseous chemical reaction product and uses of the said method and corresponding device.

BACKGROUND OF THE INVENTION

The invention relates to a method for the camera-assisted detection of the radiation intensity of a chemical reaction product, in particular a gaseous reaction product, where an emission rate for the radiation intensity of the reaction product is generated from the difference of a band radiation value of the reaction product and a temperature radiation value arrived by pyrometry.

From the German patent publication DE 197 10 206 A1, a method and a device are known for a combustion analysis as well as flame monitoring in a combustion chamber. In order to rapidly detect the temperature distribution, the concentration distribution of reaction products as a result of the combustion process, as well as the parameters of the flame, a picture is taken of the flame to determine from the locally defined intensities of the picture, a spatial distribution of the combustion process characterizing parameters, at least for a predetermined spectral range. An optical system of the device comprises a lens for detecting the flame, as well as three downstream beam splitters. The bundled beams that are detected by the lens are supplied to at least four spectral ranges by means of the beam splitters and then submitted to a CCD-image sensor.

Finally, the invention refers to a device corresponding to the method. The device includes a processing unit with means for generating an emission rate for the radiation intensity of the reaction product from the difference of a band radiation value of the reaction product and a temperature radiation value of the reaction product generated by pyrometric means.

From European Patent application EP 1 091 175 B1, a method as well as a corresponding device are known for determining the excess air in a combustion process, where the formation rates of the reaction products, CN and CO from the combustion reaction are determined. Subsequently, the ratio of the determined formation rates is expressed as a value represented by the excess of air. For detecting the beam intensities at least four special cameras are contemplated.

From the European patent application EP 0 469 258 A1, a device is known for the three-dimensional image of the temperature of a flame, specifically, for the image of several flames of a burner in a boiler, such as for example in a power station. The device includes a TV-color camera for taking a picture of the flame to be imaged, wherein the TV-color camera is configured for the output of respective color signals. The device also includes a control unit having functional units that are suitable to produce from the image taken a vectorial temperature distribution by means of a two-color pyrometry. In that embodiment, it is recommended to utilize the red and green signal of the TV-color camera for the two-color pyrometry. It is specifically recommended, not to utilize the blue signal of the TV-color camera due to its low brightness and its drawback due to chemical phenomena.

In the presently known methods and devices, the drawback is that the camera systems must be oriented in possibly pixel-exact manner relative to each other in order to avoid reproduction errors between the spectrally different evaluation ranges. Thereby, additional thermal expansion effects as well as mechanical vibration that impact the optical system must be taken into account. Accordingly, each optical system must be built for a robust and stable condition. As a result, the systems are very expensive.

A further disadvantage is the time consuming mechanical adjustment of such an optical system. In addition, such systems are comparatively maintenance intensive.

A further big disadvantage is the necessary temporal synchronization between the cameras in order to realize a temporal coordination of each of the brightness signals of the cameras for the different split wave lengths ranges. Thus, the control-technical expenditure is correspondingly high.

Starting from the prior art as discussed, it is an object of the invention, to provide a method for camera assisted detection that is less costly.

It is a further object of the invention to provide suitable applications for the method according to the present invention.

Finally, it is an object of the invention to provide a corresponding device, which is less complex and at the same time more reliable.

SUMMARY OF THE INVENTION

These objects are solved in accordance with the method as set forth in claim 1. Advantageous variants of the method are set forth in the dependent claims 2 to 6. In claims 7 and 8 suitable advantageous applications of the method according to the invention are also set forth. Claim 9 sets forth a device corresponding to the method according to the present invention. Claims 10 to 13 set forth advantageous embodiments of the device.

In accordance with the invention, a RGB-color camera is provided for the detection of the radiation intensity of a reaction product in a red, green and blue wave length range. From the blue signal of the RGB-color camera, the band radiation value is formed. Finally, from the respective blue signal of the RBC camera, the corresponding temperature radiation value is formed by means of a comparative pyrometry. By means of the simultaneous pyrometric measurement, the thermal characteristic radiation of each of the reaction products can be detected and compensated for.

Alternatively, the corresponding temperature radiation value instead of the red- and green signal, can either be generated from the red signal or form the green signal by means of a pyrometry. The former is more precise as compared to the measurement of solely the red signal or the green signal due to the ratio formation of the red signal and the green signal.

The colors are designated with respect to the optical detection capacity by humans. The chemical reaction products are for example, gaseous radicals, such as for example, CO—, $C_2$—, CH—, CHOH—, CHO—, CN—, NH—, OH—, or $O_2$ radicals which typically result from a high temperature process of above 1000° C. when burning hydrocarbons. The reaction products are alternatively, or additionally elemental gases such as for example $O_2$, $N_2$ or noble gases, which for example diffuse from the materials, or substances at a high temperature process or which are added in the high temperature process.

The essential principle of the present invention is in the use of a RGB-color camera instead of several black and white cameras. Such a camera is already provided with the required wave ranges necessary for the determination of the radiation intensity.

Thus, this already reduces the number of cameras necessary by two. In other words, for the detection of the emission rate of a chemical reaction product, only a single camera is necessary. For the device according to the publications as afore-discussed, only two RGB-color cameras would be needed instead of the four black and while cameras. As a result, this device represents a far simpler assembly. Since the cost for the RGB-color camera is only slightly higher than that of a black and white camera with comparable resolution and sensitivity, the cost for the assembly are drastically reduced.

In addition, advantageously, the number of required beam splitters is also reduced. Thus, for the detection of the radiation intensity of a single chemical reaction product, a beam splitter is not even required. Generally, the number of required beam splitters correspond to the number of radiation intensities to be detected and reduced by one. Contrariwise, with the devices in the prior art, the number is increased by one.

A far greater advantage however, is such that the numerous RGB color pixels are already from the start, locally and temporally coordinated in a color sensor chip of a RGB-color camera and thereby already ideally adjusted. As a result, the mechanical adjusting job directed to the orientation of the cameras as well as the technical control effort directed to the temporal synchronization of the brightness signal for each wave length range is advantageously eliminated.

Typically, the RGB color pixel consists of one subpixel each for the color red, green and blue, wherein each subpixel if reserved for each of the colors red, green and blue. Alternatively, there can also be four subpixels per RGB color pixel, in particular, a red, two green and a blue subpixel. The three subpixels are thus also at the same resolution location within a color pixel. At the same time, the selection of each RGB subpixel of a color sensor follows, such as for example with a CCD color sensor (CCD, for charge coupled device) or a MOS color sensor (MOS, for metal oxide semiconductor) and are thus synchronized either by lines or also by image.

According to a variant of the method, an optical rejection filter with a predetermined acceptance wave length for a characteristic spectral line for the respective reaction product is anterior of at each of the RGB-color cameras, wherein the rejection filter permits transmission of only a few percent of the incoming emission in the exclusion range. With this, an especially high selectivity can be realized with respect to the emission of a chemical reaction product. Typically, such a rejection filter exhibits an acceptance wave length range of approximately 5 to 10 nm. Thus, for example, the specific frequency band of a line spectrum for CO (carbon monoxide) is in the range of 445 to 455 nm and for the reaction product CN (for cyanide) in the range of 430 to 440 nm (see also FIG. 3 thereto).

Such a rejection filter permits transmission of more than 90% of the incoming emission. The filter further preferably permits transmission of only a few percent, in particular only maximal 1% of the incoming emission in the exclusion range. Moreover, an IR filter, that is an infrared filter can be placed anterior at the rejection filter in order to filter out the majority of the incoming heat radiation. Both filters can also be integrated into a single rejection filter.

According to a further variant of the method, a light source is directed to the reaction product regarding the detection of its radiation intensity, in order to optically excite each of the reaction products into emission of a characteristic emission spectrum. The light source preferably emits a bundled light beam, in particular a laser beam. Especially, the light source emits light of a wave length of less than 500 nm, such as for example 250 nm. The emitted light is thus within a range which extends from blue, violet to ultraviolet.

According to another variant of the process, the reaction product to be detected with respect to its light intensity is formed in a high temperature process and/or is already present there. Thus, the respective reaction product radiates a characteristic emission spectrum which is predominantly in the wave length range of blue to violet. Indeed in this wave length range, the chemical reaction products, in particular, the radicals, and the optically excited gases radiate their emission spectrum as chemo-luminescence in the form of distributed spectral lines. The term "chemo-luminescence" indicates an emission of light not of a thermal source. In particular, for detecting the radiation intensity, only the frequency bands of spectral lines of a specific radiation product to be detected are being observed and filtered out, and wherein possibly further reaction products do not exhibit any characteristic spectral lines.

According to yet another variant of the process, (precisely) two RGB cameras a provided for the detection of radiation intensity which result from the combustion process and which produce the chemical reaction products CN and CO in a red, green and blue wave length range. According to the present invention from each of the blue signals of the two RGB-color cameras a band radiation value of the reaction product CN and a band radiation value of the reaction product CO is formed. From each of the red and green signals of the two color cameras, a respective temperature radiation value is formed by means of comparative pyrometry. Furthermore, from each difference of the band radiation values and the corresponding temperature radiation values a CN— formation rate and a CO formation rate are generated. Finally, from the ratio $K(CN)/K(CO)$ of the detected formation rates, a regulating variable representing the excess air during the combustion process is generated.

Thus, a controlled, optimal combustion of combustible material based on hydrocarbons, such as coal, oil or natural gas is realized, where the air supply and/or the supply of auxiliary materials, such as additives are controlled in dependence of the determined regulating variable.

The process of the present invention is advantageous for detecting at least one formation rate of a respective chemical reaction product at a combustion process in a power station, a garbage incineration installation, in an industrial oven or in a domestic burner installation, specifically, for the generation of thermal energy. The reaction products in question are for example CO—, $C_2$—, CH—, CHOH—, CHO—, CN— or NH radicals which are formed by hydrocarbon flame in a combustion chamber.

The process according to the present invention is respectively also applicable for use in a combustion engine or a gear drive, in particular, a traffic vehicle such as a motor car, a rail vehicle, boat or air plane. Thus, the combustion process in the inside of the cylinder of a benzene or diesel motor can for example be observed by means of a device corresponding to the respective process. To this end, an opening passage can be provided in the cylinder through which the optical detection of the combustion flames is carried out while the combustion engine is running. An optimal combustion can then be adjusted in dependence on the determined formation rates, in particular, the formation rates for CN and CO. Preferably, the steps of the method according to the invention are carried out on the basis of a processor-based work unit of the motor control, by means of which the air and fuel supply are adjustable. One or more devices corresponding to the method can be attached to the respective cylinder or screwed on similar to a spark plug. In a device which is preferably configured as an encapsulated device, a RGB color sensor with a placed anterior rejection filter for a respective reaction product is integrated in a pressure-tight manner with respect to the cylinder chamber. The processing unit is preferably integrated as a part of the device into the motor control. Instead of a combustion motor, the combustion process in a turbine such as for example a kerosene- or gas turbine can be monitored and observed. In that case, the afore-described the device is disposed in the area of the turbine combustion chamber.

Furthermore, the process according to the invention can be advantageously applied for the detection of at least a volume rate of a respective reaction product in a combustion process in a blast furnace for the metal production industry, in a diffusion furnace for the semiconductor industry or in a furnace where metal is hardened or sintered. In that case, compounds that are generated in the combustion chamber, can be optically detected, in particular, diffusing compounds, such as for example those that result from the hardening process by means of nitrogenizing. In dependence of the detected volume rate, an overriding process computer can be engaged for the method and the technical control. Preferably, the reaction products that are to be detected in such a combustion process may also be optically excited by means of a light source.

Likewise, the compounds that are added during the combustion process such as for example, dopant compounds in the semiconductor industry such as indium, gallium, arsenide, phosphorus and similar, are detected with respect of their volume rate, whereby by means of the simultaneous pyrometric measurement, the thermal characteristic radiation is detected and compensated for. Thus, a controlled optimal adjustment of a concentration of a specific dopant present in the combustion chamber is advantageously realized.

An object of the present invention is furthermore solved by means of a device corresponding to the method of the invention. Such a device includes a RGB-color camera with a signal- and/or data technological processing unit for the detection of the radiation intensity of a reaction product in the red, green and blue wave length range. The processing unit includes means for the formation of band radiation values from a blue signal of the RGB-color camera. The preferably processor-assisted processing unit includes means for the formation of a corresponding temperature radiation value from a red-and green signal of the RGB-color camera, by means of a comparative pyrometry.

Alternatively, the processing unit, instead of including means for the formation of the corresponding temperature radiation value from the red-and green signal, can include means for the formation of a corresponding temperature radiation value either from the red signal or from the preen signal by means of a pyrometry.

According to one embodiment, an optical rejection filter with a transmission wave length that can be predetermined for a characteristic spectral line for the respective reaction product can be disposed anterior to the RGB-color camera, wherein the rejection filter is configured such that only a few percent of the incoming emission will be able to pass through.

The device comprises in particular, a number of beam splitters, which are anterior to at least two RGB-color cameras, wherein the number of beam splitters is then reduced by the value 1 as compared to the number of RGB-color cameras.

BRIEF DESCRIPTION OF THE FIGURES OF THE DRAWING

The invention and advantageous embodiments are described in more detail in the following paragraphs where in the following figures it is shown.

DETAILED DESCRIPTION OF PREFERRED EMBODIMENTS

Figure 1:
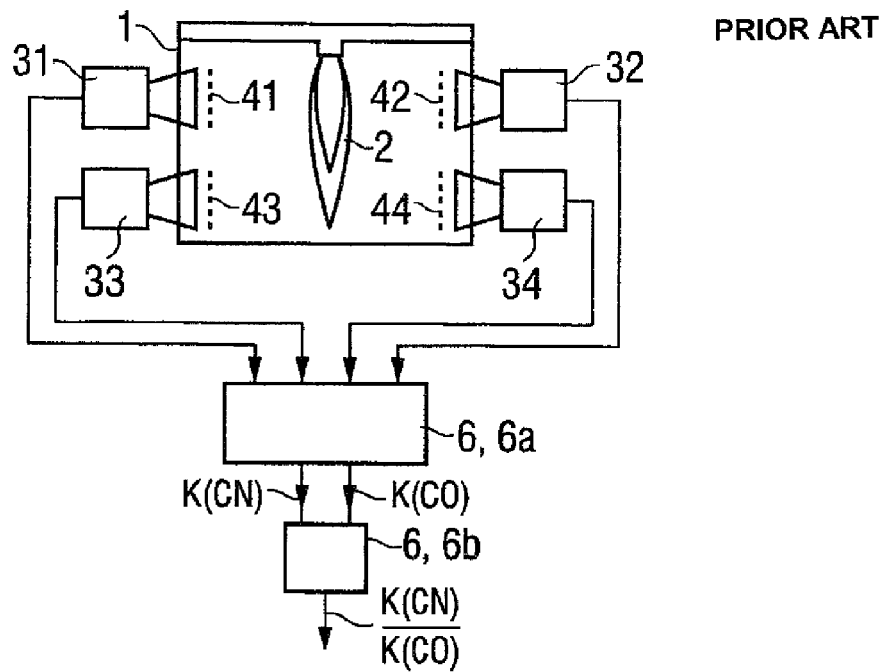
FIG. 1 a device according to the prior art for the detection of excess air at a combustion process.

FIG. 1 shows a device according to the prior art for the detection of excess air in a combustion process. In the device as shown, one and the same observation point or image frame of the combustion flame 2 in combustion chamber 1 is photographed by four CCD-cameras 31-34. Upstream at each camera 31-34 are narrow band filters 41-44 for detecting four different radiation intensities. From two of the detected radiation intensities, which preferably are located in the band free wave length ranges, a temperature radiation is determined in a downstream processing unit 6, 6a (Max-Planck radiation) according to a comparative pyrometry. The two other radiation intensities are being utilized for the detection of CN and CO formation which emit band radiation (chemo-luminescence) in the wave length range of 420 nm or 450 nm. Subsequently each of the band radiation are being subtracted from the two other radiation intensities and thus the CN and CO formation rate K(CN), K(CO) determined. In the following partial unit 6b of processing unit 6, the ratio K(CN)/K(CO) represents the value of excess air.

Figure 2:
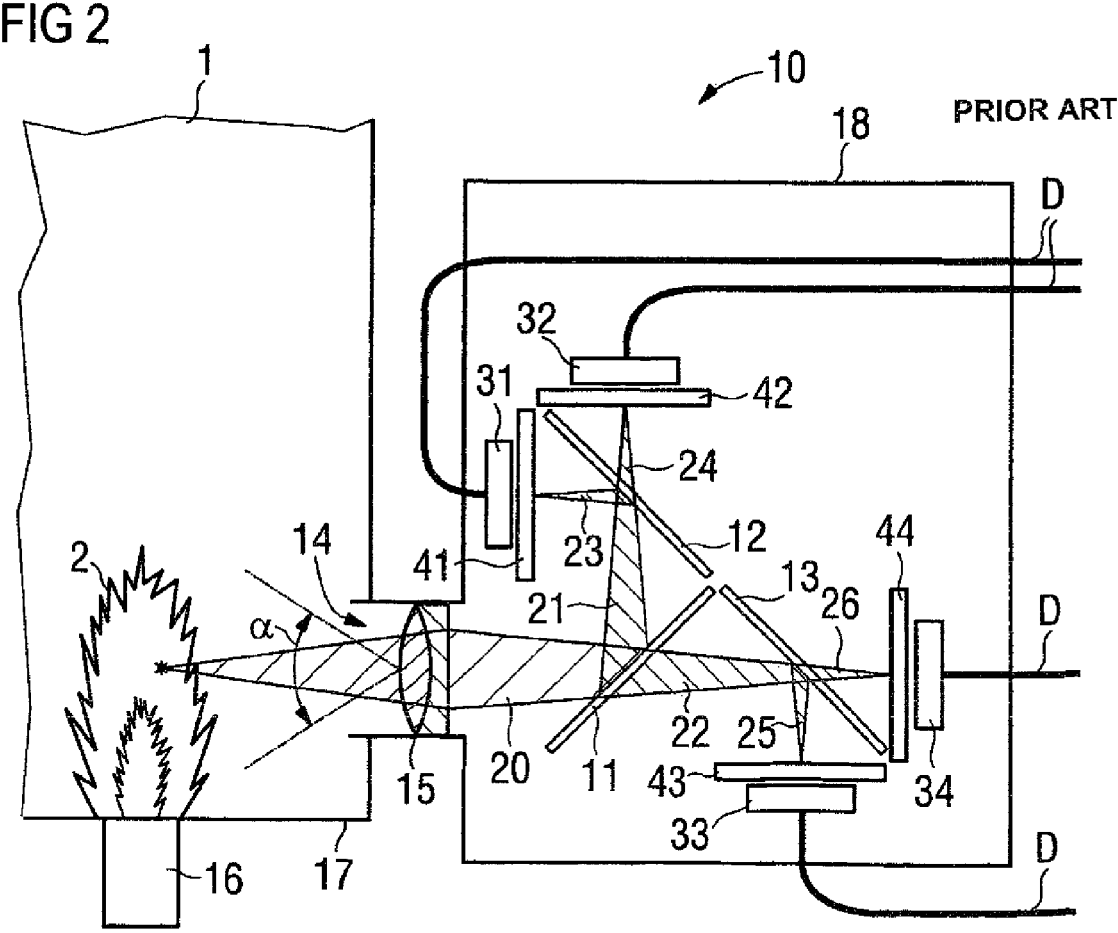
FIG. 2 a schematic illustration of a device according to the prior art for the combustion analysis in a combustion chamber.

FIG. 2 shows a schematic representation of a device according to the prior art for the combustion analysis in a combustion chamber 1 In the left portion of FIG. 2, a combustion chamber 1 is illustrated in a steam generating plant which is not shown here in detail e. g. a fossil fueled steam generator of a power station or a refuse incineration, with burner 16 shown with a flame 2. This device shown comprises an optical system 10 which detects via an opening 14 in the 17 of the combustion chamber 1, combustion characteristic radiation data D in the form of images and transmits them to a processing unit which is not shown here in detail. The symbol α designates a viewing angle onto the combustion flame 2. It should be at least as large, so that the flame 2 generated by the combustion process is virtually completely imaged by means of the subsequent lens 15 and further via the beam splitter 11-14 by the four cameras, respectively onto their light-sensitive sensor surfaces. Numeral 20 designates the incoming light bundle, with numerals 21-26, the light bundles split by the beam splitter 11-14. For filtering the four desired wave lengths ranges four narrow banded filters 41-44 are provided. The entire optical system 10 is stored in a cooled encapsulated housing 18.

Figure 3:
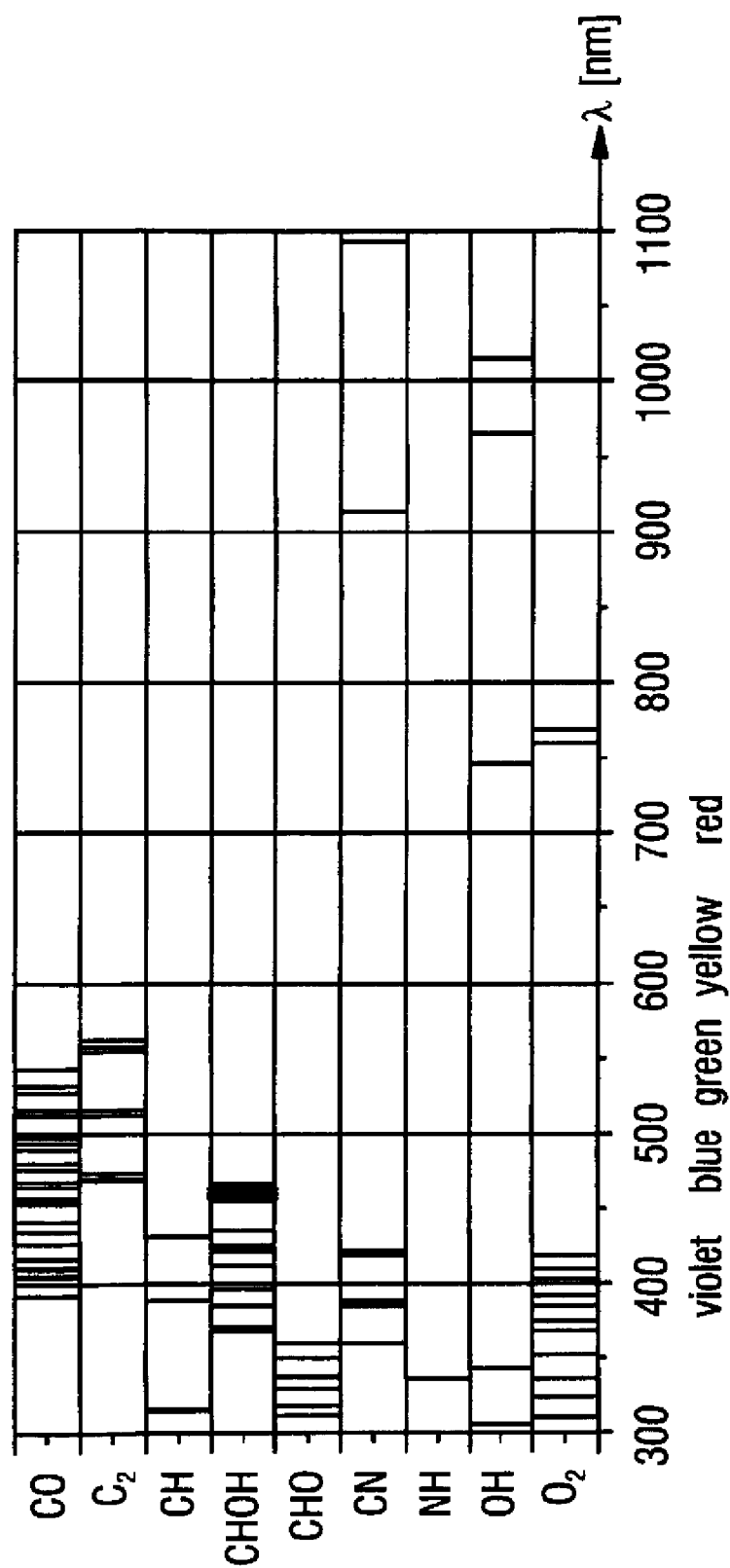
FIG. 3 exemplary radiation bands of a hydrocarbon flame.

FIG. 3 shows for example, beam bands of a hydrocarbon flame. The respective spectral lines of the beams bands for CO—, $C_2$—, CH—, CHOH—, CN—, NH—, OH—, and $O_2$ radicals are recorded as chemical reaction products via the wave length λ. As shown in FIG. 3, the spectral lines of the radiation bands in this high temperature radiation process are in the blue-green, blue, violet and ultraviolet range; whereas there are almost no spectral lines in the dominant wave length range for the temperature radiation, that is, in the green, red and infrared wave length range.

Figure 4:
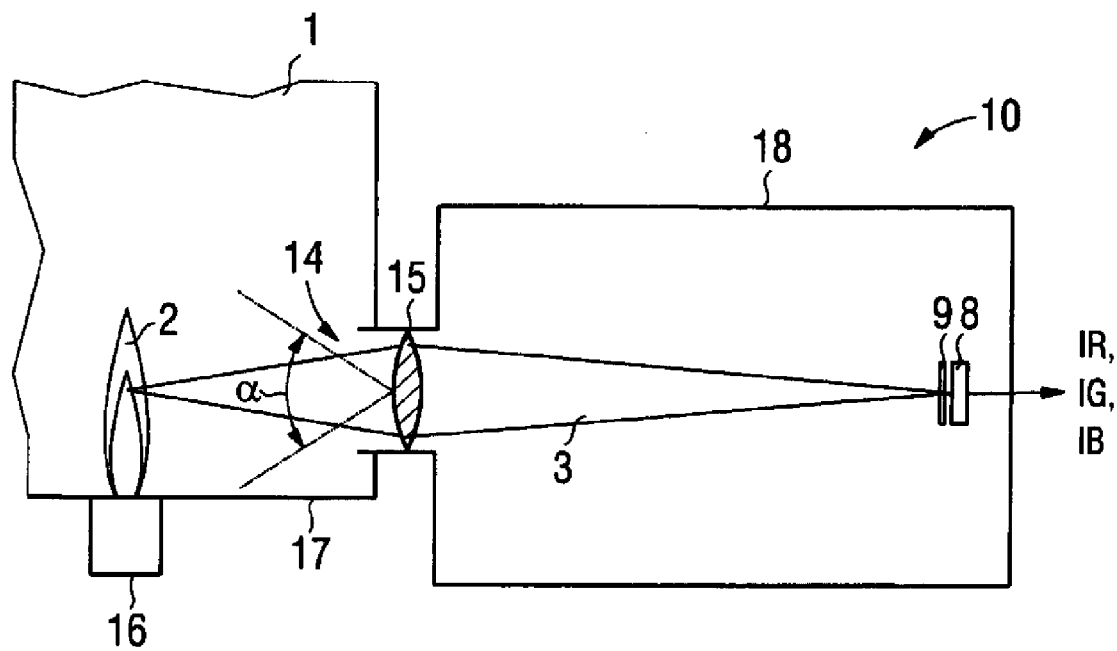
FIG. 4 a schematic illustration of the device according to the present invention showing as a example, a single camera.

FIG. 4 shows a schematic illustration of a device according to the present invention with a single RGB-color camera as an example. The camera is provided for the detection of the radiation intensity of a single reaction product in a red, green and blue wave length range. With IR, IG, IB the corresponding color signals of the RGB-color camera 8 are designated, which correspond to or are associated with the color-identified radiation intensities respectively the color radiation intensities, in the afore-stated wave length ranges. A beam splitter is not necessary in this case, due to the use of the RGB-color camera 8.

Figure 5:
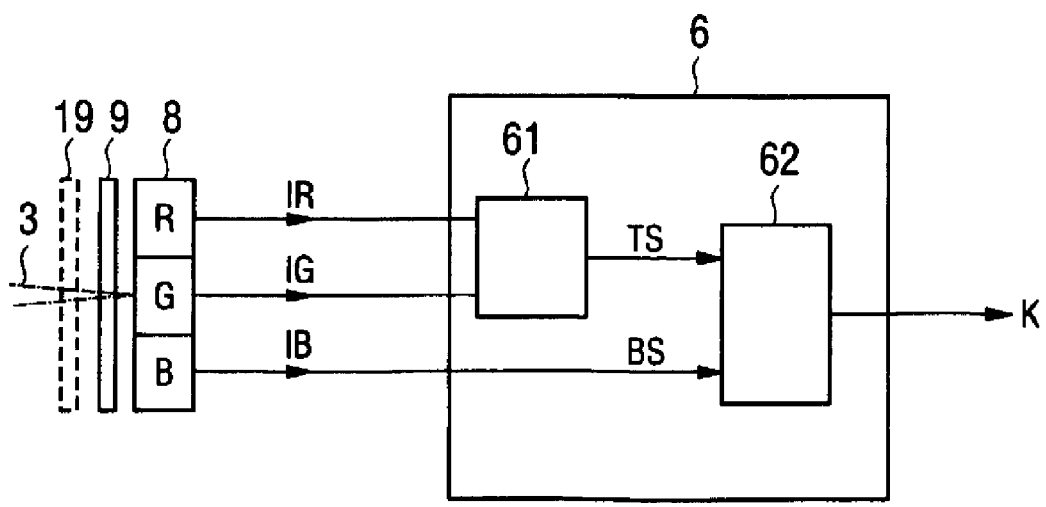
FIG. 5 the assembly of a processing unit of the device of FIG. 4.

FIG. 5 shows the assembly of a processing unit 6 of the device according to FIG. 4. The red, green and blue color sensors are designated with R, G and B. They supply the color signals corresponding to the image of flame 2. An optical rejection filter 9 is placed anterior at color camera 8, which filter has a predetermined transmission wavelength range for a specific spectral line of the respectively selected reaction product. Numeral 19 designates an optional infrared-filter, which masks the infrared range not necessary for the measurement and thus avoids the unnecessary heating of camera 8.

In accordance with the invention, the processing unit 6 includes a first partial unit 61 as a means to determine a radiation value TS though a comparative pyrometry from the red- and green signal IR, IG of the RGB-color camera 8. Furthermore, the processing unit 6 includes means not shown here in detail which form the blue signal IB of RGB-color camera 8 from a corresponding band radiation value BS of the reaction product. In the example of FIG. 5, the blue signal IB corresponds directly to the band radiation value. Further, the processing unit 6 includes a second partial unit 62, as means which forms the emission rate K from the difference of the band radiation value BS and the corresponding temperature radiation value TS for the radiation intensity of the respective reaction product.

Alternatively thereto and not shown in FIG. 5, the temperature radiation value TS can be solely measured though red signals IR or green signal IG by means of pyrometry.

The device as shown in FIG. 5 serves as a camera-supported detection of the radiation intensity in particular of a gaseous, chemical reaction product. This can be typically formed or can already be present in a high temperature process. In the present example, the high temperature process is a combustion process, where the reaction product is predominantly a characteristic emission spectrum which is present in the violet wave length range.

Figure 6:
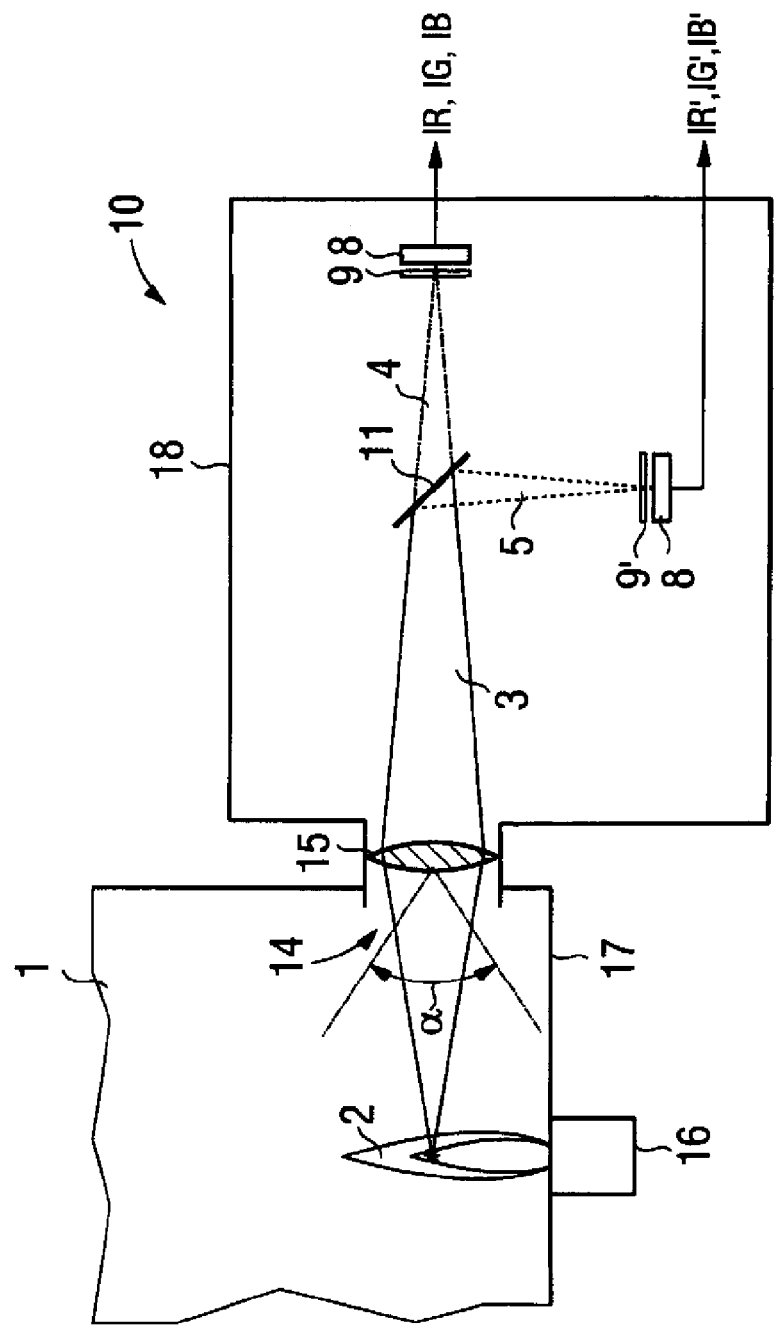
FIG. 6 a first embodiment of the device according to the present invention with two RGB-color cameras as an example.

FIG. 6 shows a first embodiment of the device according to the present invention with two RGB-color cameras 8 as an example. They are in particular provided for the detection of radiation intensities of the chemical reaction products CN and CO which form as a result of a combustion process in a red, green and blue wave length range. The device includes a beam splitter 11, which splits the incoming light bundle 4, 5. The two RGB-color cameras 8 are arranged so that the mage of the combustion flame 2 strikes approximately at the same location of the color sensor R, G, B of the two RGB-color cameras 8. An exact adjustment, as in the prior art, is not required here, since the highly precise "adjustment" is already present per se in the RGB-color camera 8. The rejection filters are designated with 9 and 9', which are matched to the two reaction products CN and CO and have a transmission wave length range of approximately 420 nm respectively 450 nm.

Figure 7:
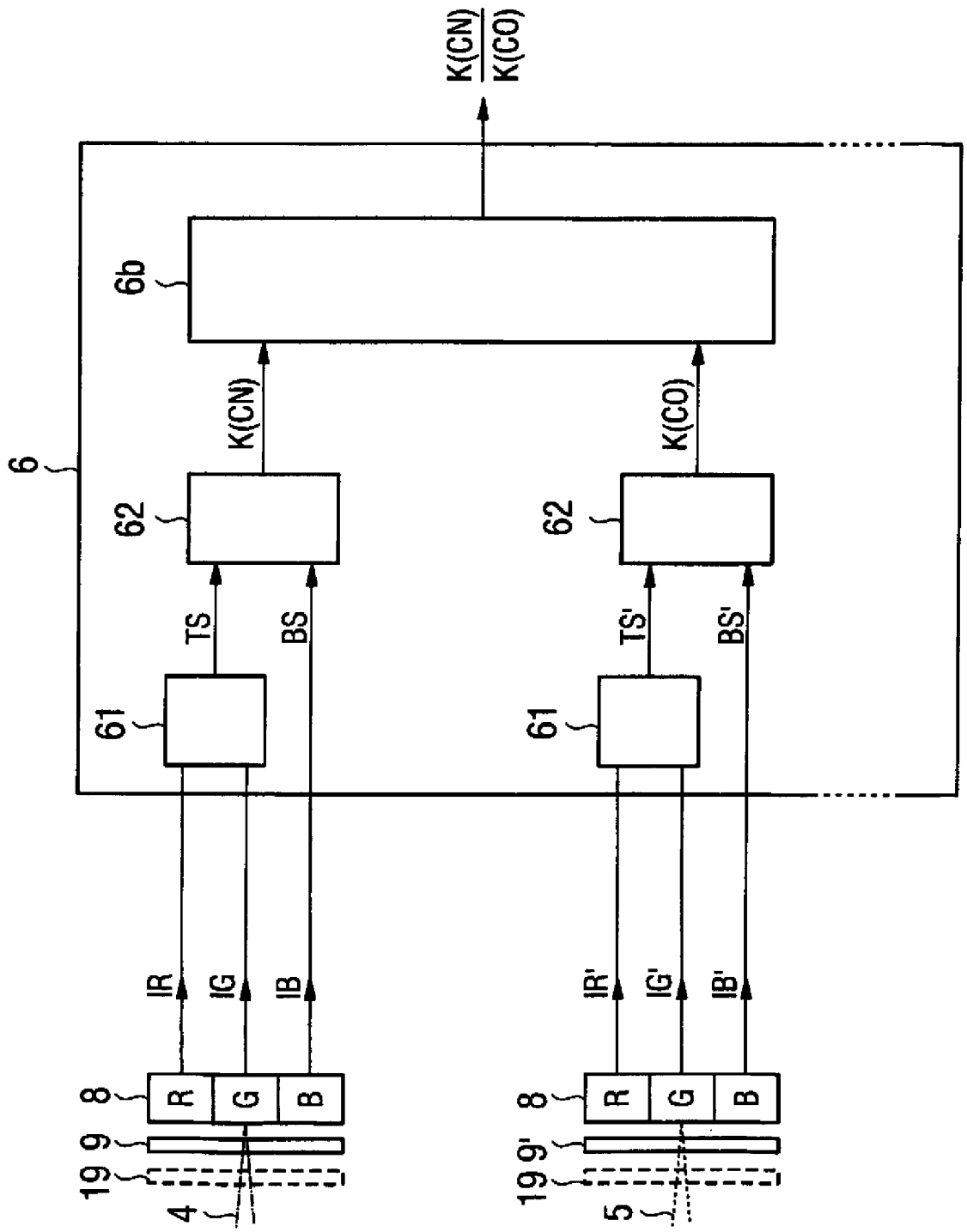
FIG. 7 the assembly of a processing unit of the device of FIG. 6.

FIG. 7 shows the assembly of a processing unit 6 of the device according to FIG. 6. The processing unit 6 includes means for the determination of each band radiation value BS, BS' of the reaction products CN and CO from each of the blue signals IB, IB' of the two RGB-color cameras 8. In addition, it includes means 61 for the formation of each temperature radiation value TS, TS' from the respective red and green signal IR, IG, IR", IG" of the two RGB-color cameras 8 by means of pyrometry. Furthermore, the shown treatment unit 6 includes means 62 for the formation of a CN formation rate K(CN) as well as a formation rate K(CO) from the respective difference of the band radiation values BS, BS' and the corresponding temperature radiation values TS, TS'. Finally, it includes means 6b for the formation of a regulation variable representing the excess air at the combustion process from the ratio K(CN)/K(CO) of the detected formation rates K(CN), K(CO). This regulating variable can be supplied to a control process of an overriding control of the combustion process.

Figure 8:
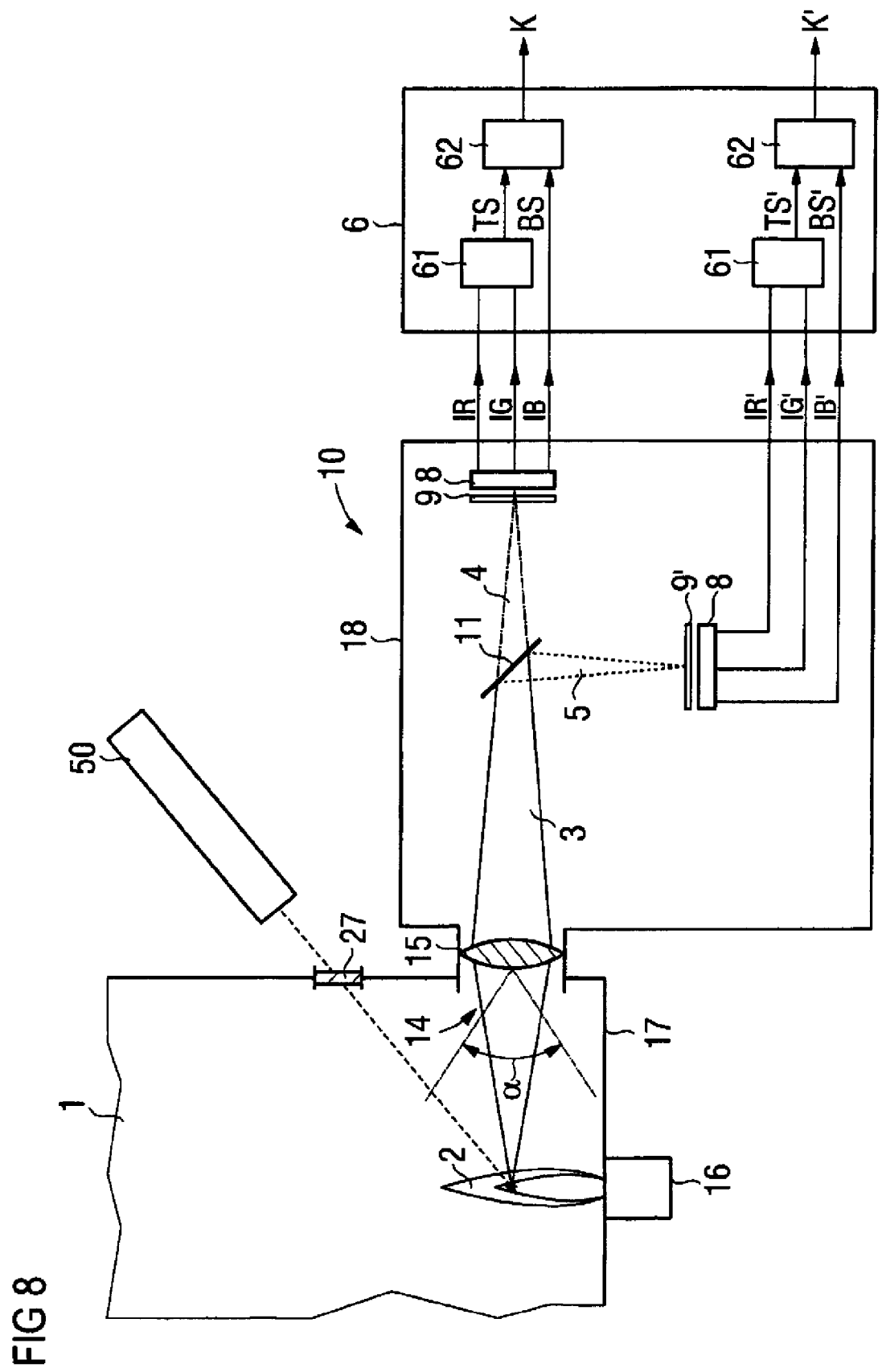
FIG. 8 a second embodiment of the device according to the invention with a light source.

FIG. 8 shows a second embodiment of the device according to the invention with a light source 50. It is pointed at the reaction product to be detected with respect to the radiation intensity in order to optically excite the respective reaction product to emit the characteristic emission spectrum. In the example of FIG. 8, the light source is a laser. To introduce the laser beam, the wall 17 of combustion chamber 1 has a small window, which is for example from quartz glass. The light introduction of optical detection of the respective reaction product can alternatively be carried out through a single window.

In present FIG. 8, the combustion flame 2 is furthermore seen. The flame is not absolutely necessary for the optical excitation of the reaction products to be detected. In other words, the shown combustion chamber can also be a "dark" or a red radiating combustion chamber, in which the reaction products are then optically excited by means of a light source 50 and which typically light up in the blue to violet wave length range.

Furthermore, the processing unit 6 of device according to FIG. 8 provides a first and second emission rate K, K' for the planned further treatment by a subsequent overriding control process. The respective emission rate K, K' can either be the formation rate of the corresponding actively emitting reaction processes in a combustion process, or the respective volume rate of corresponding reaction products in a combustion process with optically forced emission.

What is claimed is:

1. A method for a camera-assisted detection of radiation intensity, of a gaseous, chemical reaction product, comprising the steps of:
   providing a RGB-color camera for the detection of the radiation intensity of the reaction product in red, green and blue wave lengths,
   generating from a blue signal (IB) of the RGB-color camera a band radiation value (BS), and
   generating by means of a comparative pyrometry from one red- and green signal (IR, IG) of the RGB-color camera, the corresponding temperature radiation value (TS), from the difference of band radiation value (BS) of the reaction product and a temperature radiation value (TS) formed by pyrometric means, computing an emission rate (K) for the radiation intensity of the formed reaction product.

2. The method according to claim 1, wherein the corresponding temperature radiation value (TS), instead of being generated from the red-and green signal (IR, IG) is either generated from the red signal (IR) or from the green signal (IG) by means of a pyrometry.

3. The method according to claim 1, wherein, an optical rejection filter with a transmission wave length that can be predetermined for a characteristic spectral line of the respective reaction product, is located upstream of the RGB-color camera, wherein the rejection filter permits the transmission of only a few percent of the incoming emission in an exclusion range.

4. The method according to claim 1, wherein a light source (50) is directed at the reaction product to be detected with respect to the radiation intensity, in order to optically excite the respective reaction product for emitting a characteristic emission spectrum.

5. The method according to claim 1, wherein the respective reaction product to be detected with respect to the radiation intensity is formed in a high temperature process or is already present there and that the respective reaction product emits a characteristic emission spectrum which is predominantly in the blue to violet wave length range.

6. The method according to claim 5, wherein
two RGB-color cameras are provided for the detection of radiation intensities of chemical reaction products CN and CO in a red, green and blue wave length range, formed in a combustion process, wherein from each of the blue signals (IB, IB') of the two RGB-color cameras, a band radiation value (BS) for the reaction product CN and a band radiation value (BS') for the reaction product CO is generated,
wherein from each of the red and green signals (IR, IG, IR', IG') of the two RGB-color cameras, a corresponding temperature radiation value (TS, TS'), by means of a comparative pyrometry, is generated,
wherein from the respective differences of the band radiation values (BS, BS') and the corresponding temperature radiation values (TS, TS'), a CN formation rate K(CN) and CO formation rate K(CO) is generated and,
wherein from the ratio K(CN)/K(CO) of the detected formation rates K(CN), K(CO) a regulating variable is resulting, which represents the excess air in the combustion process.

7. The method according to claim 1, wherein the detection of at least a formation rate (K) of a respective reaction product is carried out in connection with a combustion process taking place in one or more selected from the group consisting in a power station, in a garbage incineration installation, an industrial furnace, a domestic furnace and in a combustion engine or gear drive, a motor vehicle, a rail vehicle, boat or airplane.

8. The method according to claim 1 for the detection of at least a volume rate of a respective reaction product in a combustion process taking place in one or more selected from the group of a blast furnace for the metal production industry, in a diffusion furnace for the semiconductor industry and in a furnace for hardening and sintering of metals.

9. A device for the camera-assisted detection of radiation intensity of a gaseous chemical reaction product, comprising:
a processing unit having means for the formation of an emission rate (K) for the radiation intensity of the reaction product derived from the difference of a band radiation value (BS) of the reaction product and a temperature radiation value (TS) formed by pyrometric means of the reaction product, wherein
the processing unit is signal-and/or data technically connected to a RGB-color camera for the detection of the radiation intensity of the reaction product in a red, green and blue wavelength range and includes means for the formation of the band radiation value (BS) from the blue signal (IB) of the RGB-color camera, and includes further means for the formation of the corresponding temperature radiation value (TS) through comparative pyrometry from the red and green signal (IR, IG) of the RGB-color camera.

10. The device according to claim 9, wherein the processing unit, instead of means for formation of the corresponding temperature radiation value (TS) from the red-and green signal (IR, IG), includes means for the formation of the corresponding temperature radiation value (TS) by means of a pyrometry, either from the red signal (IR) or from the green signal (IG).

11. The device according to claim 9, further comprising an optical rejection filter with a predetermined transmission wave length range for a characteristic spectral line of the respective reaction product which is place anterior to the RGB-color camera, and wherein the rejection filter is configured for the passage of only a few percent of the incoming emission in the exclusion range.

12. The device according to claim 9, further comprising two RGB-color cameras for the detection of the radiation intensities of one of the chemical reaction products CN and CO resulting from the combustion process in a red, green and blue wavelength range, and
wherein the processing unit includes means for the detection of a respective band radiation value (BS, BS") of the reaction products CN and CO from the respective blue signals (IB, IB") of the two RGB-color cameras; means for the formation of a respective temperature radiation value (TS, TS") from the respective red-and green signal (IR, IG, IR', IG') of the two RGB-color cameras (8) by means of a comparative pyrometry; means for the formation of a CN-formation rate K(CN) and CO-formation rate K(CO) from each of the differences of the band radiation values (BS, BS') and the corresponding temperature radiation value (TS. TS') and means for the formation of a regulating variable that represents the excess air in a combustion process from the ratio K(CN)/K(CO) of the detected formation rates K(CN), K(CO).

13. The device according to claim 12, wherein, the device includes a number of beam splitters that are placed anterior to the two RGB-color cameras, and wherein the number of beam splitters is reduced by the value of 1 as compared to the number of RGB-color cameras.

* * * * *